(12) United States Patent
Saragih et al.

(10) Patent No.: US 10,636,192 B1
(45) Date of Patent: Apr. 28, 2020

(54) GENERATING A GRAPHICAL REPRESENTATION OF A FACE OF A USER WEARING A HEAD MOUNTED DISPLAY

(71) Applicant: Facebook Technologies, LLC, Menlo Park, CA (US)

(72) Inventors: Jason Saragih, Pittsburgh, PA (US); Hernan Badino, Pittsburgh, PA (US); Shih-En Wei, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 7 days.

(21) Appl. No.: 16/022,754

(22) Filed: Jun. 29, 2018

Related U.S. Application Data

(60) Provisional application No. 62/527,980, filed on Jun. 30, 2017.

(51) Int. Cl.
*G06T 13/40* (2011.01)
*G06K 9/00* (2006.01)
*G06T 17/00* (2006.01)

(52) U.S. Cl.
CPC .......... *G06T 13/40* (2013.01); *G06K 9/00281* (2013.01); *G06K 9/00302* (2013.01); *G06T 17/00* (2013.01); *G06T 2200/08* (2013.01)

(58) Field of Classification Search
None
See application file for complete search history.

(56) References Cited

U.S. PATENT DOCUMENTS

| 9,710,912 | B2 | 7/2017 | Kim et al. |
| 2006/0188144 | A1 | 8/2006 | Sasaki et al. |
| 2006/0290699 | A1 | 12/2006 | Dimtrva et al. |
| 2009/0109220 | A1 | 4/2009 | Tomson et al. |
| 2009/0231347 | A1 | 9/2009 | Omote |
| 2012/0177283 | A1 | 7/2012 | Wang et al. |
| 2013/0147788 | A1* | 6/2013 | Weise .................. G06T 13/40 345/419 |

(Continued)

OTHER PUBLICATIONS

Tang et al. ("Automatic construction of 3D human face models based on 2D images." Proceedings of 3rd IEEE International Conference on Image Processing. vol. 3. IEEE, 1996.), (Year: 1996).*

(Continued)

*Primary Examiner* — Yi Wang

(74) *Attorney, Agent, or Firm* — Fenwick & West LLP

(57) ABSTRACT

A virtual reality (VR) or augmented reality (AR) head mounted display (HMD) includes various facial sensors, such as cameras, that capture images of portions of the user's face outside of the HMD. For example, multiple facial sensors capture images of a portion of the user's face below the HMD. Through image analysis, points of the portion of the user's face are identified from the images and their movement is tracked. The identified points are mapped to a three dimensional model of a face. Additionally, a parametric representation of the user's face is determined for each captured image, resulting in various representations indicating the user's facial expressions. From the parametric representations and transforms mapping the captured images to three dimensions, a rendering model is used and applied to the three dimensional model of the face to render the user's facial expressions.

19 Claims, 6 Drawing Sheets

(56) References Cited

U.S. PATENT DOCUMENTS

| | | |
|---|---|---|
| 2014/0125789 A1 | 5/2014 | Bond et al. |
| 2015/0310263 A1 | 10/2015 | Zhang et al. |
| 2015/0363971 A1* | 12/2015 | Pan .................. G06T 17/00 345/420 |
| 2016/0042557 A1* | 2/2016 | Lin .................... G06T 7/73 345/426 |
| 2016/0070952 A1 | 3/2016 | Kim et al. |
| 2016/0148411 A1 | 5/2016 | Chen et al. |
| 2016/0163084 A1 | 6/2016 | Corazza et al. |
| 2016/0216760 A1 | 7/2016 | Trutna et al. |
| 2016/0342828 A1 | 11/2016 | Lee et al. |
| 2016/0360970 A1 | 12/2016 | Tzvieli et al. |
| 2016/0361653 A1 | 12/2016 | Zhang et al. |
| 2017/0091535 A1 | 3/2017 | Yu et al. |
| 2017/0352178 A1 | 12/2017 | Katz et al. |
| 2018/0137678 A1* | 5/2018 | Kaehler ............. G06K 9/00275 |
| 2018/0158230 A1 | 6/2018 | Yan et al. |
| 2018/0158246 A1 | 6/2018 | Grau et al. |
| 2018/0253895 A1 | 9/2018 | Arumugam |
| 2018/0308276 A1 | 10/2018 | Cohen et al. |
| 2018/0374242 A1 | 12/2018 | Li et al. |
| 2019/0122411 A1 | 4/2019 | Sachs et al. |

OTHER PUBLICATIONS

United States Office Action, U.S. Appl. No. 16/022,758, dated Sep. 9, 2019, 14 pages.

\* cited by examiner

GENERATING A GRAPHICAL REPRESENTATION OF A FACE OF A USER WEARING A HEAD MOUNTED DISPLAY

CROSS-REFERENCE TO RELATED APPLICATIONS

This application claims the benefit of U.S. Provisional Application No. 62/527,980, filed Jun. 30, 2017, which is incorporated by reference in its entirety.

BACKGROUND

The present disclosure generally relates to head mounted displays, and more specifically relates to tracking portions of a user's face that are uncovered by a head mounted display.

Virtual reality systems typically include a display presenting content to users. For example, many virtual reality, or augmented reality, systems include a head-mounted display including a display element presenting image or video data to a user. Content presented by the virtual reality system depicts objects and users of the system.

Many virtual reality systems present graphical representations, or avatars, of users in a virtual environment to facilitate interactions between users. However, conventional virtual reality systems provide limited graphical representations of a user. For example, avatars representing users in many conventional virtual reality systems have a single facial expression, such as a default smiling or neutral facial expression, or a limited set of facial expressions. These limited facial expressions shown by avatars in virtual reality systems often present users from having a fully immersive experience in a virtual environment.

Including a facial tracking system in a virtual reality system or in an augmented reality system may provide a more immersive interface by allowing facial expressions of a graphical representation of a user to more accurately reflect facial expressions of the user. However, conventional facial tracking systems typically include a dedicated peripheral, such as a camera, as well as markers positioned on the face of a user being tracked. Using markers and the additional peripheral may separate users from a provided virtual environment and are unsuitable for use in a portable, lightweight, and high-performance virtual reality headset.

SUMMARY

A head-mounted display (HMD) in a virtual reality (VR) system or in an augmented reality (AR) system includes an electronic display presenting content to a user. Additionally, the HMD includes one or more facial sensors coupled to one or more surfaces of the HMD. For example, a facial sensor is a camera or other image capture device positioned to capture images of portions of the user's face. In some embodiments, the facial sensor also includes an illumination device configured to illuminate the portions of the user's face captured by the facial sensor. Different facial sensors are configured to capture images of different portions of the user's face. For example, two facial sensors are positioned on a lower surface of the HMD and positioned to captured images of portions of the user's face that are outside of the HMD. As an example, the HMD is a rigid body including the display element, and the facial sensors capture characteristics of the portions of the user's face outside of the rigid body. In the preceding example, each facial sensor is configured to capture half of the portion of the user's face below the lower surface of the HMD and outside of the HMD.

A controller coupled to the facial sensors receives images captured by the facial sensors and processes the received images to identify points from portions of the user's face captured by the facial sensors. For example, the controller identifies points along the user's mouth from images captured by each facial sensor. In various embodiments, the controller uses a machine learned model to identify points within a portion of the user's face. The machine learned model may be trained based on training data where users performed various facial expressions and facial sensors captured portions of the user's faces while performing the various facial expressions; different users then identify points within the captured portions of their faces when the users performed the facial expressions. The controller applies the trained model to images captured by each facial sensor to identify the points within portions of the user's face included in images captured by each facial sensor.

The controller also projects a facial animation model of the user from the images captured by the facial sensors while the HMD is in use by the user. The controller generates a trained model for mapping a set of positions of identified points within images captured by each facial sensor to a set of animation parameters that determines the facial animation model of the user's face that is projected onto the virtual reality environment of the HMD, or of another HMD. In various embodiments, the trained model maps the positions of identified points within images captured by each facial sensor to a three-dimensional model of a face. In some embodiments, the three-dimensional model of the face is selected from a library of three-dimensional models to match the user. The controller determines an expression parameter that is a parametric representation of a human face for each image captured by the facial sensors and the trained model maps the parametric representations to animation parameters that render movement of the portions of the user's face on the three-dimensional model of the face. For example, the expression parameter for each image is a blendshape vector, and the trained model maps the the blendshape vectors to animation parameters that render the movement of the portions of the user's face on the three-dimensional model of the face. While the HMD is in use, the trained model reconstructs a facial animation model of the user from positions of points within images of portions of the user's face captured by each facial sensor that identify movement of portions of the user's face.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
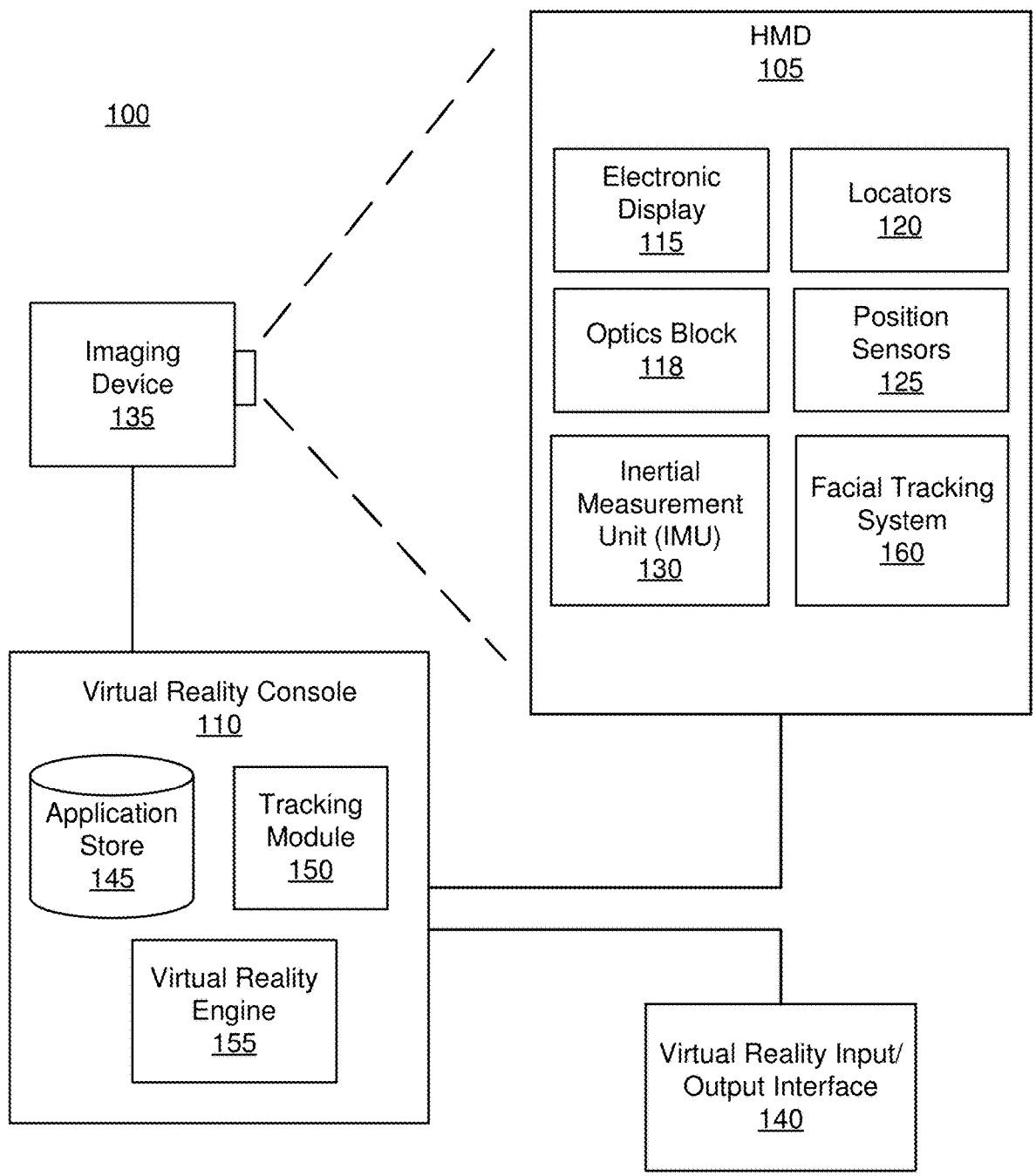
FIG. 1 is a block diagram of a virtual reality or an augmented reality system environment, in accordance with an embodiment.

FIG. 1 is a block diagram of a system environment 100 for providing virtual reality (VR) content or augmented reality (AR) content in accordance with an embodiment. The system environment 100 shown by FIG. 1 comprises a head mounted display (HMD) 105, an imaging device 135, and an input/output (I/O) interface 140 that are each coupled to a console 110. While FIG. 1 shows an example system environment 100 including one HMD 105, one imaging device 135, and one I/O interface 140, in other embodiments, any number of these components are included in the system environment 100. For example, an embodiment includes multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system environment 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. An embodiment of the HMD 105 is further described below in conjunction with FIGS. 3 and 4. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification and focusing of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The HMD 105 may include various locators 120 in some embodiments. The locators 120 are objects located in specific positions on the HMD 105 relative to one another and relative to a specific reference point on the HMD 105. For example, a locator 120 is a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration data. The reference point is a point describing the position of the HMD 105. While the reference point may generally be defined as a point in space, in practice, the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The facial tracking system 160 generates reconstructions of portions of a face of a user wearing the HMD 105, as further described below in conjunction with FIGS. 2-5. In an embodiment, the facial tracking system 160 includes one or more facial sensors and a controller, as further described below in conjunction with FIG. 2. In some embodiments, the facial tracking system 160 also includes one or more illumination sources configured to illuminate portions of the user's face within fields of view of the one or more facial sensors. Based on data from the facial sensors, the controller generates a trained model that maps positions of points identified within images captured by the facial sensors to a set of animation parameters that determines a facial animation model projecting movement of the portions of the user's face into a three dimensional model of a face presented via a virtual reality environment of the HMD 105, as further described below in conjunction with FIG. 5.

The imaging device 135 generates slow calibration data in accordance with calibration parameters received from the console 110. Slow calibration data includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The input/output (I/O) interface 140 is a device that allows a user to send action requests to the console 110 and to receive responses from the console 110. An action request is a request to perform a particular action. For example, an action request may be to start or end an application or to perform a particular action within the application. The I/O interface 140 may include one or more input devices. Example input devices include: a keyboard, a mouse, a game controller, or any other suitable device for receiving action requests and communicating the received action requests to the console 110. An action request received by the I/O interface 140 is communicated to the console 110, which performs an action corresponding to the action request. In some embodiments, the I/O interface 140 may provide haptic feedback to the user in accordance with instructions received from the console 110. For example, haptic feedback is provided when an action request is received or when the console 110 communicates instructions to the I/O interface 140 causing the I/O interface 140 to generate haptic feedback when the console 110 performs an action.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a tracking module 150, and a virtual reality (VR) engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the HMD 105. For example, the tracking module 150 adjusts the focus of the imaging device 135 to obtain a more accurate position for observed locators 120 on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some of or the entire system environment 100, The tracking module 150 tracks movements of the HMD 105 using slow calibration information from the imaging device 135. The tracking module 150 determines positions of a reference point of the HMD 105 using observed locators 120 on the HMD 105 from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the VR engine 155.

The VR engine 155 executes applications within the system environment 100 and receives position information, acceleration information, velocity information, predicted future positions, or some combination thereof of the HMD 105 from the tracking module 150. Based on the received information, the VR engine 155 determines content to provide to the HMD 105 for presentation to a user. For example, if the received information indicates that the user has looked to the left, the VR engine 155 generates content for the HMD 105 that mirrors the user's movement in a virtual environment. Additionally, the VR engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Facial Tracking System

Figure 2:
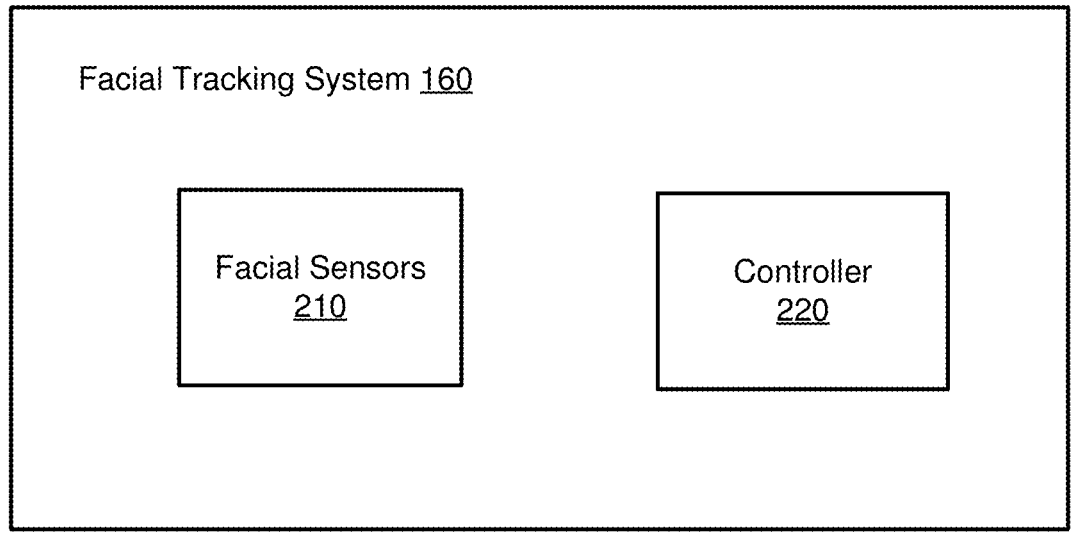
FIG. 2 is a block diagram of a facial tracking system of the virtual reality or the augmented reality system, in accordance with an embodiment.

FIG. 2 is a block diagram of one embodiment of a facial tracking system 160 of the system environment 100 for VR or AR. In the example shown in FIG. 2, the facial tracking system 160 includes one or more facial sensors 210 and a controller 220. In other embodiments, different and/or additional components may be included in the facial tracking system 160.

The facial sensors 210 capture images of portions of a face of a user of the HMD 105. In various embodiments, the facial sensors 210 comprise one or more image capture devices, such as cameras, positioned with fields of view capturing different portions of the face of the user. Different facial sensors 210 have known positions relative to each other and are positioned to have fields of view including different portions of the user's face. In some embodiments, different facial sensors 210 may have partially overlapping fields of view. One or more of the facial sensors 210 may be depth sensors in some embodiments, while in other embodiments the facial sensors 210 include a combination of image capture devices and depth sensors. Facial sensors 210 that are image capture devices may capture images based on light having different wavelengths reflected by the portions of the user's face. For example, a facial sensor 210 captures infrared light reflected by a portion of the user's face, while in another example a facial sensor 210 captures visible light reflected by the portion of the user's face. Facial sensors 210 have plurality of parameters such as focal length, focus, frame rate, ISO, sensor temperature, shutter speed, aperture, resolution, etc. In some embodiments, the facial sensors 210 have a high frame rate and high resolution. The facial sensors 210 can capture two-dimensional images or three-dimensional images in various embodiments.

One or more facial sensors 210 may be non-optical sensors that capture information describing characteristics of portions of the user's face in various embodiments. Example non-optical sensors for use as a facial sensor 210 include: an audio sensor, a strain gauge, an electric sensor, a magnetic sensor, a proximity sensor, or any other sensor capturing non-optical data. Hence, in various embodiments, the one or more facial sensors 210 may comprise image capture devices, non-optical sensors, or a combination of image capture devices and non-optical sensors.

In some embodiments, one or more illumination sources are coupled to one or more surfaces of the HMD 105 and are positioned to illuminate portions of the user's face, such as portions of the user's face that are not behind the HMD 105. Illumination sources may be positioned at discrete locations along the HMD 105. In some embodiments, the one or more illumination sources are coupled to one or more exterior surfaces of the HMD 105. Example illumination sources include be light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources have different characteristics. As an example, different illumination sources emit light having different wavelengths or different temporal coherences describing correlation between light waves at different points in time. Further, light emitted by different illumination sources may be modulated at different frequencies or amplitudes (i.e., varying intensity) or multiplexed in a time domain or in a frequency domain.

The controller 220 is coupled to the facial sensors 210 and communicates instructions to the facial sensors 210. Instructions from the controller 220 to a facial sensor 210 cause the facial sensor 210 to capture one or more images of portions of the user's face within the field of view of the facial sensor or to capture other data describing characteristics of a portion of the user's face visible to the facial sensor 210. In an embodiment, the controller 220 stores captured data describing characteristics of portions of the user's face (e.g., images of portions of the user's face) in a storage device accessible by the controller 220. As further described below in conjunction with FIG. 5, the controller includes a trained model that maps positions of points identified within images captured by various facial sensors 210 to a set of animation parameters that determines a facial animation model that is projected onto a virtual reality environment so a graphical representation of the user's face in a virtual reality environment represents the user's facial expression or movement captured by the facial sensors 210.

In some embodiments, the controller 220 communicates the facial animation model to the console 110, which may store the facial animation model in association with information identifying the user. The console 110 may communicate the facial animation model and information associated with the user to one or more other consoles 110, allowing HMDs 105 coupled to the other consoles 110 to present graphical representations of the user's face that reflects facial expressions or movements of the user. In some embodiments, the console 110 may communicate the facial animation model to a server that stores facial animation models in association with information identifying different users. Additionally, the console 110 may modify content provided to the HMD 105 for presentation based on the facial animation model and other information received from the controller 220, such as positions of points identified within images captured from one or more facial sensors 210 and provided to the controller 220. For example, the console 110 generates a graphical representation of the user's face that renders movement of the portions of the user's face on a three-dimensional model based on the facial animation model and positions of points identified within images captured of the user's face; this allows the graphical representation of the user's face to replicate expressions and movement of portions of the user's face captured by the one or more facial sensors 210.

Head Mounted Display

Figure 3:
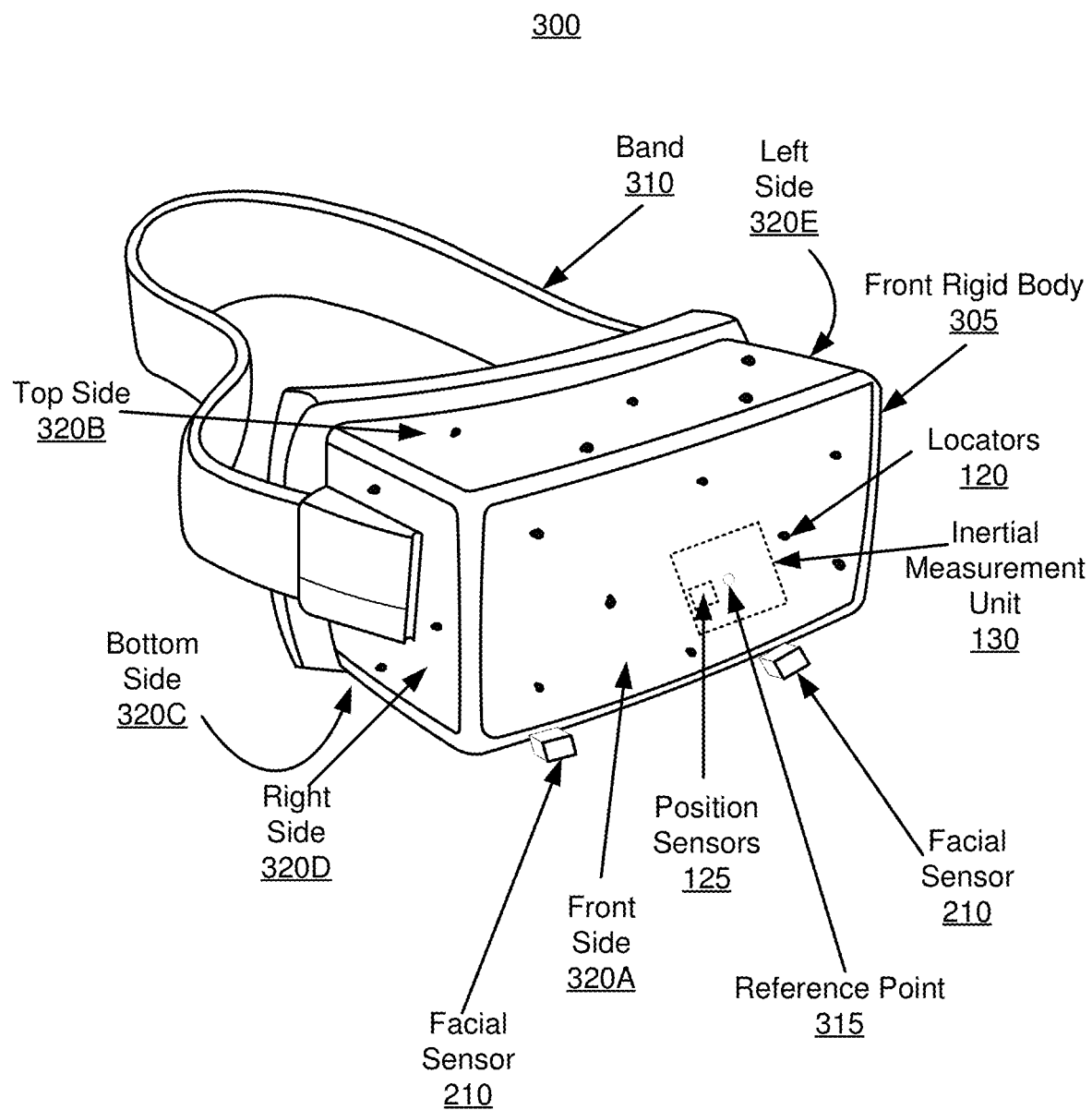
FIG. 3 is a wire diagram of a virtual reality head mounted display, in accordance with an embodiment.

FIG. 3 is a wire diagram of one embodiment of a HMD 300. The HMD 300 shown in FIG. 3 is an embodiment of the HMD 105 that includes a front rigid body 305 and a band 310. The front rigid body 305 includes the electronic display 115 (not shown in FIG. 3), the IMU 130, the one or more position sensors 125, and the locators 120. In the embodiment shown by FIG. 3, the position sensors 125 are located within the IMU 130, and neither the IMU 130 nor the position sensors 125 are visible to the user.

The locators 120 are located in fixed positions on the front rigid body 305 relative to one another and relative to a reference point 315. In the example of FIG. 3, the reference point 315 is located at the center of the IMU 130. Each of the locators 120 emit light that is detectable by the imaging device 135. Locators 120, or portions of locators 120, are located on a front side 320A, a top side 320B, a bottom side 320C, a right side 320D, and a left side 320E of the front rigid body 305 in the example shown in FIG. 3.

In the example of FIG. 3, the HMD 300 includes facial sensors 210 coupled to the bottom side 320A of the HMD 300. For example, a facial sensor 210 is coupled to the bottom side 320C of the HMD 300 proximate to the right side 320D of the HMD 300, and another facial sensor 210 is coupled to the bottom side 320C of the HMD 300 proximate to the left side 320E of the HMD 300. The facial sensors 210 capture characteristics of portions of the user's face below the bottom side 320C of the HMD 300. In the example of FIG. 3, the facial sensor 210 captures characteristics of portions of the user's face proximate to the right side 320D of the HMD 300, while the other facial sensor 210 captures characteristics of portions of the user's face proximate to the left side 320E of the HMD 300. While FIG. 3 shows an embodiment with two facial sensors 210, any number of facial sensors 210 may be included in various embodiments. In some embodiments, the facial sensors 210 are image capture devices (e.g., cameras) capturing images of portions of the user's face and having specific positions relative to each other. However, the facial sensors 210 may be non-optical devices in some embodiments configured to capture other characteristics describing portions of the user's face. Example non-optical sensors include: an audio sensor, a strain gauge, an electric sensor, a magnetic sensor, a proximity sensor, or any other sensor capturing non-optical data. In various embodiments, the HMD 300 may include a set of facial sensors 210 that are non-optical sensors and another set of facial sensors 210 that are image capture devices or other optical sensors.

Figure 4:
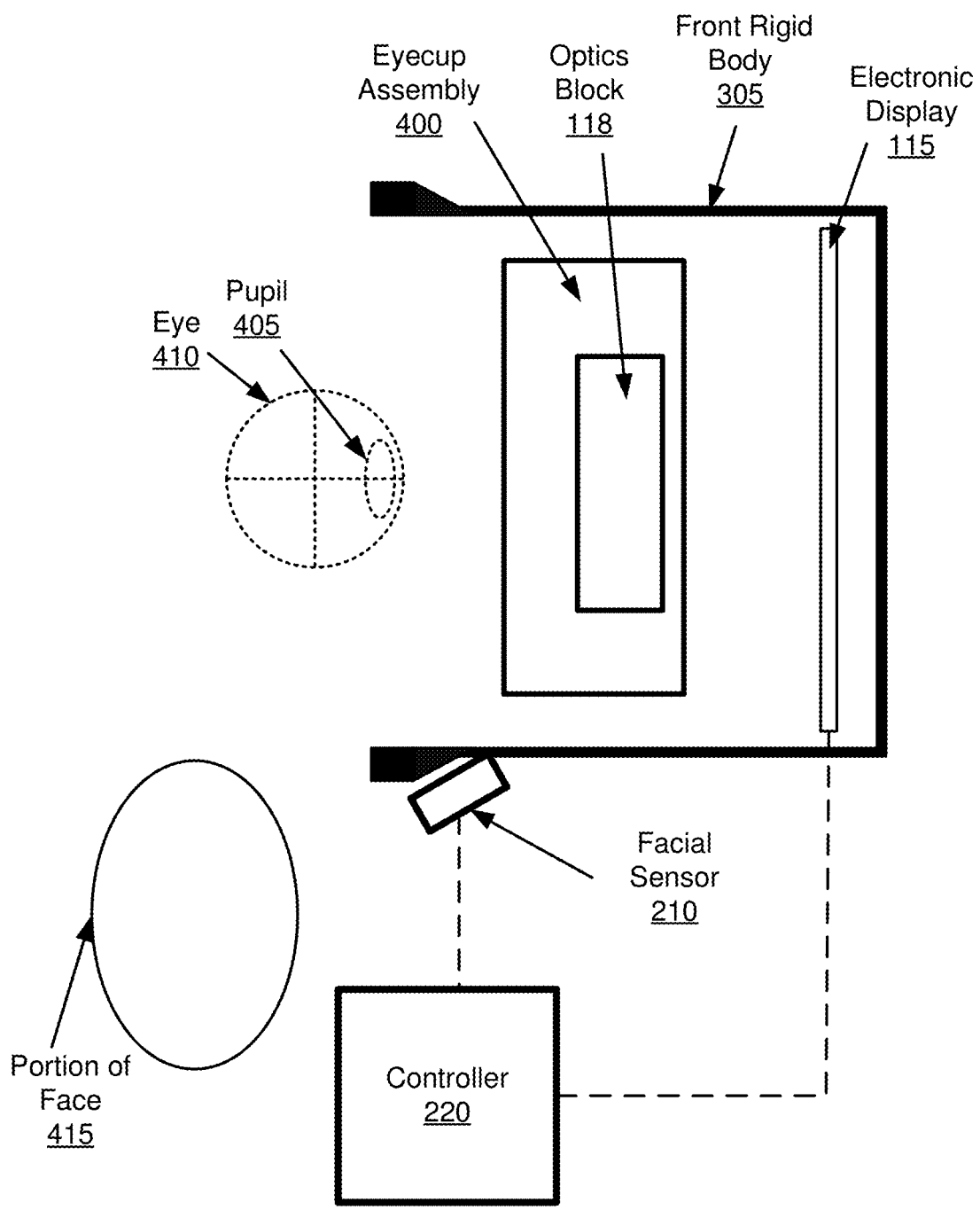
FIG. 4 is a cross section of the front rigid body of the virtual reality head mounted display in FIG. 3, in accordance with an embodiment.

FIG. 4 is a cross-sectional diagram of an embodiment of the front rigid body 305 of the HMD 300 shown in FIG. 3. In the embodiment shown in FIG. 4, the front rigid body 305 includes an eyecup assembly 400, a facial sensor 210, a controller 220, an optics block 118, and an electronic display 115. While FIG. 4 shows a single eyecup assembly 400 for a single eye 410 of the user, another eyecup assembly is included in the front rigid body 305 for another eye of the user. Thus, the front rigid body 305 includes an eyecup assembly 400 for each of a user's eyes. The facial sensor 210 is coupled to a bottom side of the front rigid body 305 in the example shown by FIG. 4 and positioned to capture images of a portion 415 of the user's face. For purposes of illustration, FIG. 4 shows a single facial sensor 210; however, in various embodiments, any suitable number of facial sensors 210 may be coupled to the front rigid body 305 and positioned to capture images of the portion 415 of the user's face. Other facial sensors 210 may capture images of other portions of the user's face. For example, the facial sensor 210 is proximate to a right side of the front rigid body 305, while an additional facial sensor 210 is proximate to a left side of the front rigid body 305. While FIG. 4 shows the facial sensor 210 coupled to an exterior surface of the front rigid body 305, in some embodiments the facial sensor 210 is coupled to an interior surface of the front rigid body 305, which is transparent to or does not substantially attenuate wavelengths of light captured by the facial sensor 210.

The front rigid body 305 includes an optical block 118 that magnifies image light from the electronic display 115, and in some embodiments, also corrects for one or more additional optical errors (e.g., distortion, astigmatism, etc.) in the image light from the electronic display 115. The optics block 118 directs the image light from the electronic display 115 to a pupil 405 of the user's eye 410 by directing the altered image light to an exit pupil of the front rigid body 305 that is a location where the user's eye 410 is positioned when the user wears the HMD 300. For purposes of illustration, FIG. 4 shows a cross section of the right side of the front rigid body 305 (from the perspective of the user) associated with a single eye 410, but another optical block, separate from the optical block 118, provides altered image light to another eye (i.e., a left eye) of the user.

The controller 220 is communicatively coupled to the electronic display 115, allowing the controller 220 to provide content for to the electronic display 115 for presentation to the user (e.g., a graphical representation of one or more portions 415 of the user's face based on data captured by the facial sensor 210). Additionally or alternatively, the controller 220 is communicatively coupled to the console 110 and communicates a facial animation model for generating graphical representations of one or more portions 415 of the user's face to the console 110, which includes one or more graphical representations of portions 415 of the user's face in content provided to the electronic display 115, or generates content for presentation by the electronic display 115 based at least in part on the facial animation model received from the controller 220. Additionally, the controller 220 is communicatively coupled to the facial sensor 210, allowing the controller 220 to provide instructions to the facial sensor 210 for capturing images of the portion 415 of the user's face.

Generating a Facial Animation Model of a User Wearing a HMD

Figure 5:
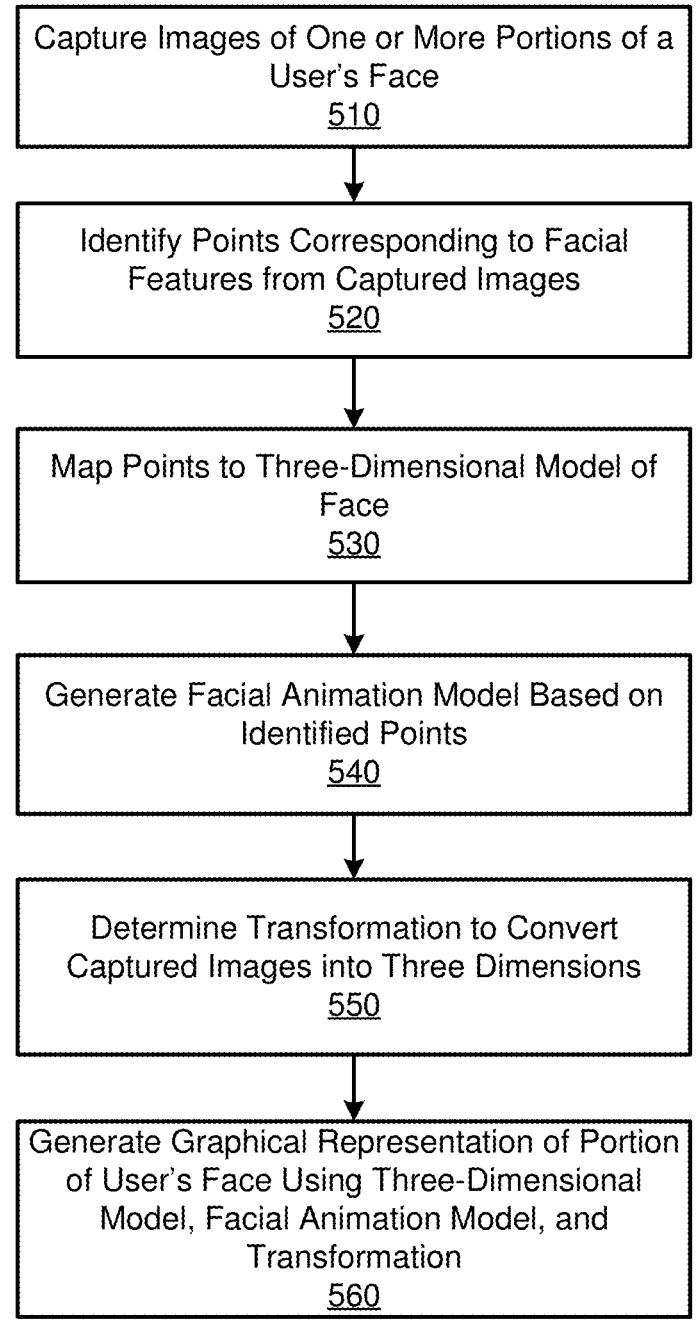
FIG. 5 is a flowchart of a method for generating a graphical representation of a user's face while the user wears a head mounted display, in accordance with an embodiment.

FIG. 5 is a flowchart of one embodiment of a method for generating a graphical representation of a user's face while the user wears a head mounted display (HMD) 105. The method described in conjunction with FIG. 5 may be performed by the facial tracking system 160, the console 110, or another system in various embodiments. Other entities perform some or all of the steps of the method in other embodiments. Embodiments of the process may include different or additional steps than those described in conjunction with FIG. 5. Additionally, in some embodiments, steps of the method may be performed in different orders than the order described in conjunction with FIG. 5.

One or more facial sensors 210 coupled to a HMD 105 worn by a user capture images 510 of portions of the user's face. In various embodiments, multiple facial sensors 210 are coupled to the HMD 105, with each facial sensor 210 configured to capture 510 images of a different portion of the user's face. The different portions of the user's face partially overlap in some embodiments, while in other embodiments the different portions of the user's face do not overlap. A facial sensor 210 captures 510 a series of images of a portion of the user's face within a field of view of the facial sensor 210.

The one or more facial sensors 210 communicate the captured images to the controller 220, which identifies 520 points corresponding to features of the portion of the user's face within each of the captured images. Features of the portion of the user's face corresponding to boundaries of parts of the user's face. For example, identified points correspond to positions along boundaries of the user's lips or positions along the user's chin. As an example, the identified points correspond to corners of the user's lips and various locations along boundaries of the user's lips. To identify 520 the points in images of a portion of the user's face, the controller 220 obtains a model trained on a set of images of various facial expressions made by various users that include the points on portions of the users' faces identified by the users. For example, a user makes specific facial expressions, and images of portions of the user's face are captured by facial sensors 210 when the user makes each specific facial expression. The user is subsequently prompted to identify various points in the captured images corresponding to each specific facial expression. Based on the points identified by the users when various specific facial expressions were made, a machine learned model is trained to identify 520 the points from the captured images. In various embodiments, different machine learned models are trained to identify 520 points on different portions of the user's face. The controller 220 applies the trained model to images captured 510 by different facial sensors 210 to identify 520 points in images of portions of the user's face captured 510 by different facial sensors 210. For example, the controller 220 identifies 520 points of portions of the user's face included in each image captured 510 by one or more facial sensors 210.

The controller 220 maps 530 the identified points to a three-dimensional model of a face for generating a graphical representation of the portions of the user's face corresponding to the captured images. In some embodiments, the three-dimensional model of the face is selected from a stored library of three-dimensional models based on characteristics of the user. For example, the user specifies one or more parameters and the controller 220 selects a three-dimensional model of a face from the library that has at least a threshold amount of parameters matching the parameters specified by the user; the controller 220 identifies points on the selected three-dimensional model corresponding to the points identified 520 from the captured images to map 530 the identified points to the selected three-dimensional model. Alternatively, the controller 220 receives an image of the user's face and selects a three-dimensional model of a face having at least a threshold similarity to the image of the user's face and maps 530 the identified points to the selected three-dimensional model.

From the points identified in images captured 510 by one or more facial sensors 210, the controller 220 generates 540 a facial animation model of the portions of the user's face of which the facial sensors 210 captured 510 images. In various embodiments, the facial animation model is an expression parameter comprising a parametric representation of human faces, where different parameters correspond to different expressions of the portion of the user's face included in a captured image. For example, the parametric representation of human faces is a blendshape model that models facial expressions of the user as a linear combination of blendshapes that each correspond to an expression of the portion of the user's face included in a captured image. In various embodiments, the facial animation model calculates a combination of coefficients corresponding to different human facial expressions that determine a weight of each human facial expression in a combination. When the facial animation model is a blendshape model, the facial animation model calculates a vector of blendshape coefficients that determine the weight of each expression mesh in the linear combination. Hence, a vector of blendshape coefficients is determined for each image captured by a facial sensor 210. The blendshape coefficients may be extracted based on positions of the identified points within various captured images, so the positions of the identified points within captured images determine weights corresponding to various facial expressions in the calculated vector. Weights for various expressions of the portion of the user's face may be determined from the identified points within the captured images using any suitable method in various embodiments.

Additionally, the controller 220 determines 550 transformations mapping the two-dimensional images captured 510 by each facial sensor 210 into three-dimensions. Any suitable method may be used by the controller to determine 540 transformations mapping images captured 510 from various facial sensors 210 to three dimensions in various embodiments. The controller also determines differential transformations between pairs of facial sensors 210 that account for movement of the facial sensors 210 in one or more dimensions. For example, a differential transformation accounts for movement of the facial sensors 210 in a horizontal direction, while another differential transformation accounts for movement of the facial sensors 210 in a vertical direction. In some embodiments, the controller 220 determines six differential transformations to account for movement of the facial sensors 210 in six directions. In various embodiments, each differential transformation attenuates movement in a direction based on an expected variance of movement in the direction; for example, a differential transformation attenuates movement in a vertical direction relative to attenuation of movement in a horizontal direction by another differential transformation, as movement in the vertical direction is more likely. Hence, the differential transformations compensate for movement of the facial sensors 210 while the user is wearing the HMD 105.

In some embodiments, a differential transformation differently attenuates various weights associated with expression parameters (e.g., attenuates various weights associated with blendshapes). For example, for weights between a minimum value and a threshold value, the differential transform applies a quadratic penalty to the weights to reduce sparseness between facial expressions corresponding to different expression parameters (e.g., blendshapes). However, in the preceding example, the differential transform applies a linear penalty to weights between the threshold value and an additional threshold, which prevents attenuation by the differential transformation from attenuating the weights so differences between facial expressions corresponding to different expression parameters are reduced, resulting in an overly muted graphical representation of facial expressions of the user.

Based on the transformations and facial animation model, as well as the differential transformations, the controller 220 generates a rendering model, which is applied to the three-dimensional model of the face to reposition the points of the three-dimensional model mapped to the identified points within images captured by the facial sensors 210 to generate a graphical representation of the user's face where the portions of the graphical representation of the user's face corresponding to the portions of the user's face captured by the facial sensors 210 have an expression corresponding to an expression of the portions of the user's face captured by the facial sensor 210. Hence, as expressions of the portions of the user's face change while the user is wearing the HMD 105, the rendering model alters corresponding portions of the three dimensional model of the face based on points identified 520 from images captured 510 by the facial sensors 210. In various embodiments, the controller 220 provides the rendering model to the console 110 in association with information identifying the user, allowing the console 110 to store the rendering model in association with the user or to communicate the rendering model along with information identifying the user to other consoles 110 or other HMDs 105. The controller 220 may alternatively or additionally provide the rendering model and information identifying the user to controllers 220 coupled to other HMDs 105, allowing the other HMDs 105 to render the graphical representation of the user's face and alter portions of the graphical representation of the user's face as the facial sensors 210 on the HMD 105 identify changes to the portions of the user's face captured by the facial sensors 210.

Figure 6:
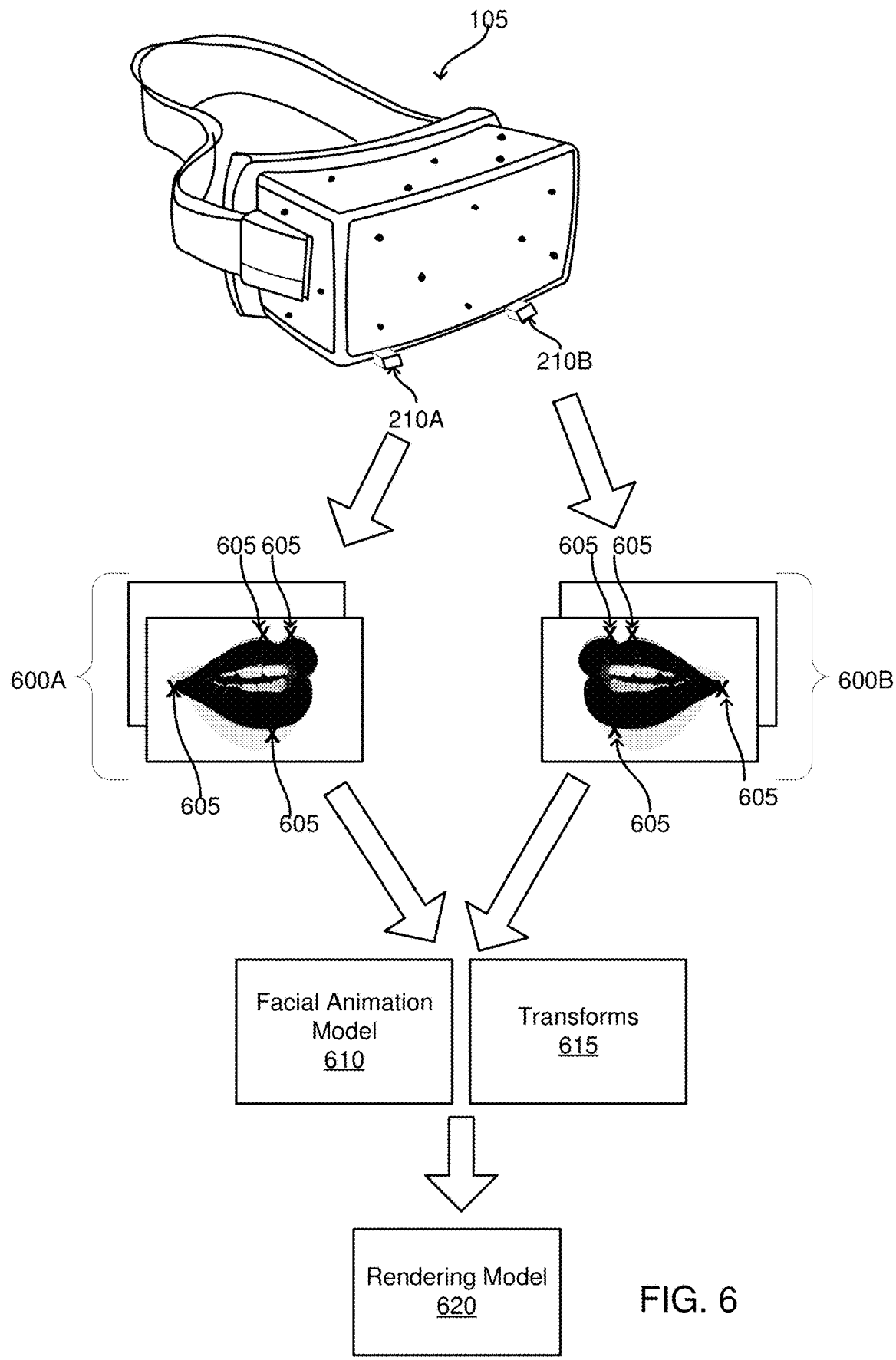
FIG. 6 is a conceptual diagram of generation of a graphical representation of a user's face from images of the user's face captured while the user wears a head mounted display, in accordance with an embodiment.

FIG. 6 is a conceptual diagram of generating a graphical representation of a user's face while the user wears a head mounted display (HMD) 105. In the example of FIG. 6, two facial sensors 210A, 210B (also referred to individually and collectively using reference number 210). Each facial sensor 210A, 210B is positioned to capture images of a portion of the user's face while the user wears the HMD 105. In the example of FIG. 6, the facial sensors 210A, 210B each capture images 600A, 600B of a corresponding portion of the user's face that is below the HMD 105 when the user wears the HMD 105. For purposes of illustration, FIG. 6 shows an example where the facial sensor 210A captures images 600A of a user's mouth from a particular angle relative to the user's mouth, while the facial sensor 210B captures images 600B of the user's mouth from a different angle relative to the user's mouth.

As further described above in conjunction with FIG. 2, each facial sensor 210A, 210B communicates captured images 600A, 600B to a controller 220 coupled to the facial sensors 210A, 210B. The controller 220 identifies points 605 in each image 600A, 600B corresponding to particular features of the user's face. In the example of FIG. 6, the controller 220 identifies points 605 corresponding to corners of the user's mouth and various points 605 along the user's lips, such as points along a boundary of the user's lips. As further described above in conjunction with FIG. 5, the controller 220 applies a trained model to the captured images 600A, 600B in various embodiments to identify the points 605 in each image 600A, 600B.

From the identified points 605 identified in various images 600A, 600B, the controller 220 generates a facial animation model 610 of the portions of the user's face included in the images 600A, 600B, as further described above in conjunction with FIG. 5. In various embodiments, the facial animation model 610 comprises expression parameters that form a parametric representation of human faces modeling facial expressions as a combination of expression parameters that each correspond to an expression of the portion of the user's face. For example, the facial animation model 610 is a blendshape model that models facial expressions of the user as a linear combination of blendshapes that each correspond to an expression of the portion of the user's face. When the facial animation model 610 is a blendshape model, the facial animation model 610 calculates a vector of blendshape coefficients that determine the weight of each expression mesh in the linear combination. In other embodiments, the facial animation model 610 determines any suitable combination of expression paramaters that determine a weight of different expressions of a user's face. Weights for various expressions of the portion of the user's face may be determined from the identified points within the captured images using any suitable method in various embodiments.

Additionally, the controller 220 determines transforms 615 mapping the two-dimensional images 600A, 600B to three dimensions and one or more differential transformations accounting for movement of facial sensors 210A, 210B in one or more directions, as further described above in conjunction with FIG. 5. From the facial animation model 610 and the transforms 615, the controller generates a rendering model 620 that is applied to a three-dimensional model of a face to generate a graphical representation of the portions of the user's face included in the captured images 600A, 600B that is modified by the rendering model 620 to replicate facial expressions captured by the facial sensors 210A, 210A while the user wears the HMD 205.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    obtaining images of portions of a user's face enclosed by a head mounted device (HMD) captured by one or more image capture devices;
    identifying points corresponding to features of the portions of the user's face within the images of the portions of the user's face;
    mapping the identified points to a three-dimensional model of a face;
    generating a set of animation parameters for each portion of the user's face from identified points within the images captured by the one or more image capture devices;
    determining one or more transformations mapping images captured by the one or more image capture devices into three dimensions;
    determining a plurality of differential transformations between images captured by pairs of image capture devices, each differential transformation differently attenuating one or more weights associated with one or more expression parameters corresponding to facial expressions;
    generating a rendering model based on the sets of animation parameters, the one or more expression parameters, the determined one or more transformations, and the plurality of differential transformations;
    repositioning one or more points of the three-dimensional model of the face by applying the rendering model to the three-dimensional model of the face; and
    generating content presenting the three-dimensional model of the face with the repositioned one or more points.

2. The method of claim 1, wherein the features of the portions of the user's face within the images of the portions of the user's face comprise boundaries of one or more parts of the user's face.

3. The method of claim 1, wherein identifying points corresponding to features of the portions of the user's face within the images of the portions of the user's face comprises:
    applying a model trained from various additional users identifying points corresponding to features of faces of each additional user in previously captured images of the additional users' faces while the additional users make different specific facial expressions to the images of the portions of the user's face.

4. The method of claim 1, wherein mapping the identified points to the three-dimensional model of a face comprises:
    selecting the three-dimensional model of the face from a stored library of three-dimensional models of faces based on characteristics of the user; and
    identifying points on the three-dimensional model corresponding to the identified points.

5. The method of claim 4, wherein selecting the three-dimensional model of the face from the stored library of three-dimensional models of faces based on characteristics of the user comprises:
    receiving an image of the user's face; and
    selecting a three-dimensional model of a face of the stored library of three-dimensional models of faces having at least a threshold similarity to the image of the user's face.

6. The method of claim 1, wherein the set of animation parameters comprises a parametric representation of human faces that determines a weight of different human facial expressions in a combination.

7. The method of claim 6, wherein the parametric representation of human faces comprises a vector of blendshape coefficients that determines a weight of different facial expressions in a linear combination.

8. The method of claim 1, wherein determining one or more differential transformations between pairs of image capture devices comprises:
    determining six differential transformations between pairs of image capture devices.

9. A computer program product comprising a non-transitory computer readable storage medium having instructions encoded thereon that, when executed by a processor, cause the processor to:
    obtain images of portions of a user's face enclosed by a head mounted device (HMD) captured by one or more image capture devices coupled to the HMD;
    identify points corresponding to features of the portions of the user's face within the images of the portions of the user's face;
    map the identified points to a three-dimensional model of a face;
    generate a set of animation parameters for each portion of the user's face from identified points within the images captured by the one or more image capture devices;
    determine one or more transformations mapping images captured by the one or more image capture devices into three dimensions;
    determine a plurality of differential transformations between images captured by pairs of image capture devices, each differential transformation differently attenuating one or more weights associated with one or more expression parameters corresponding to facial expressions;
    generate a rendering model based on the sets of animation parameters, the one or more expression parameters, the determined one or more transformations, and the plurality of differential transformations;
    reposition one or more points of the three-dimensional model of the face by applying the rendering model to the three-dimensional model of the face; and
    generate content presenting the three-dimensional model of the face with the repositioned one or more points.

10. The computer program product of claim 9, wherein the features of the portions of the user's face within the images of the portions of the user's face comprise boundaries of one or more parts of the user's face.

11. The computer program product of claim 10, wherein identify points corresponding to features of the portions of the user's face within the images of the portions of the user's face comprises:
apply a model trained from various additional users identifying points corresponding to features of faces of each additional user in previously captured images of the additional users' faces while the additional users make different specific facial expressions to the images of the portions of the user's face.

12. The computer program product of claim 9, wherein map the identified points to the three-dimensional model of a face comprises:
select the three-dimensional model of the face from a stored library of three-dimensional models of faces based on characteristics of the user; and
identify points on the three-dimensional model corresponding to the identified points.

13. The computer program product of claim 12, wherein select the three-dimensional model of the face from the stored library of three-dimensional models of faces based on characteristics of the user comprises:
receive an image of the user's face; and
select a three-dimensional model of a face of the stored library of three-dimensional models of faces having at least a threshold similarity to the image of the user's face.

14. The computer program product of claim 9, wherein the set of animation parameters comprises a parametric representation of human faces that determines a weight of different human facial expressions in a combination.

15. The computer program product of claim 14, wherein the parametric representation of human faces comprises a vector of blendshape coefficients that determines a weight of different facial expressions in a linear combination.

16. A head mounted display (HMD) comprising:
a front rigid body configured to enclose one or more portions of a face of the user;
a set of image capture devices coupled to the front rigid body, each image capture device configured to capture images of one or more portions of the face of the user enclosed by the front rigid body of the HMD; and
a controller coupled to the set of image capture devices, the controller configured to:
obtain images of the one or more portions of the face of the user enclosed by the front rigid body of the HMD from one or more of the image capture devices;
identify points corresponding to features of the portions of the user's face within the images of the portions of the face of the user enclosed by the front rigid body of the HMD;
map the identified points to a three-dimensional model of a face;
generate a set of animation parameters for each portion of the user's face included in at least one image captured by an image capture device of the set from identified points within the images captured by the set of image capture devices;
determine one or more transformations mapping images captured by the set of image capture devices into three dimensions;
determine a plurality of differential transformations between images captured by pairs of image capture devices, each differential transformation differently attenuating one or more weights associated with one or more expression parameters corresponding to facial expressions;
generate a rendering model based on the sets of animation parameters the one or more expression parameters, the determined one or more transformations, and the plurality of differential transformations;
reposition one or more points of the three-dimensional model of the face by applying the rendering model to the three-dimensional model of the face; and
generate content presenting the three-dimensional model of the face with the repositioned one or more points.

17. The HMD of claim 16, wherein identify points corresponding to features of the portions of the user's face within the images of the portions of the face of the user enclosed by the front rigid body of the HMD comprises:
apply a model trained from various additional users identifying points corresponding to features of faces of each additional user in previously captured images of the additional users' faces while the additional users make different specific facial expressions to the images of the portions of the user's face.

18. The HMD of claim 16, wherein map the identified points to the three-dimensional model of a face comprises:
select the three-dimensional model of the face from a stored library of three-dimensional models of faces based on characteristics of the user; and
identify points on the three-dimensional model corresponding to the identified points.

19. The HMD of claim 16, wherein the set of animation parameters comprises a parametric representation of human faces that determines a weight of different human facial expressions in a combination.

* * * * *